United States Patent
Okino

(10) Patent No.: US 9,844,048 B2
(45) Date of Patent: Dec. 12, 2017

(54) RESOURCE ALLOCATION SYSTEM AND CONTROL METHOD

(71) Applicant: KYOCERA CORPORATION, Kyoto (JP)

(72) Inventor: Kenta Okino, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 181 days.

(21) Appl. No.: 14/796,805

(22) Filed: Jul. 10, 2015

(65) Prior Publication Data

US 2015/0319756 A1    Nov. 5, 2015

Related U.S. Application Data

(63) Continuation of application No. 13/994,078, filed as application No. PCT/JP2011/078537 on Dec. 9, 2011, now Pat. No. 9,113,451.

(30) Foreign Application Priority Data

Dec. 13, 2010 (JP) .................. 2010-277383

(51) Int. Cl.
*H04W 4/00* (2009.01)
*H04W 72/04* (2009.01)
(Continued)

(52) U.S. Cl.
CPC .......... *H04W 72/0433* (2013.01); *H04L 5/00* (2013.01); *H04L 5/0044* (2013.01);
(Continued)

(58) Field of Classification Search
CPC ........................ H04W 72/0433; H04W 74/002
(Continued)

(56) References Cited

U.S. PATENT DOCUMENTS 8,401,481 B1 * 3/2013 Shah .................. H04W 16/32
455/444
8,880,089 B2    11/2014 Morimoto et al.
(Continued)

FOREIGN PATENT DOCUMENTS

| WO | 2009/123146 A1 | 10/2009 |
| WO | 2010/048491 A1 | 4/2010 |
| WO | 2011/130438 A1 | 10/2011 |

OTHER PUBLICATIONS

3GPP TSG RAN WG1 #57bis; Los Angles, CA; Jun. 29-Jul. 3, 2009; R1-092705; Agenda item: 15:4; Qualcomm Europe; "Carrier Aggregation in Heterogeneous Networks"; pp. 1-10.
(Continued)

*Primary Examiner* — Farah Faroul
(74) *Attorney, Agent, or Firm* — Studebaker & Brackett PC

(57) ABSTRACT

A radio communication system 1 according to an embodiment comprises: a pico cell base station PeNB provided in a communication area of a macro cell base station MeNB and having transmission power lower than transmission power of the macro cell base station MeNB. A resource division ratio is determined with respect to radio resources to be usable as a physical downlink shared channel (PDSCH), indicating a ratio of macro cell unusable PDSCH resources and macro cell usable PDSCH resources. The radio resources are assigned to a radio terminal connected to the macro cell base station MeNB, out of the macro cell usable PDSCH resources determined according to the determined resource division ratio. The resource division ratio is determined according to expected throughputs of each of cell edge terminals of the macro cell base station MeNB and the pico cell base station PeNB.

5 Claims, 10 Drawing Sheets

(51) Int. Cl.

| | | |
|---|---|---|
| *H04W 74/00* | (2009.01) | |
| *H04W 8/20* | (2009.01) | |
| *H04W 28/16* | (2009.01) | |
| *H04W 52/18* | (2009.01) | |
| *H04W 16/08* | (2009.01) | |
| *H04L 5/00* | (2006.01) | |
| *H04W 88/02* | (2009.01) | |
| *H04W 88/08* | (2009.01) | |
| *H04W 88/12* | (2009.01) | |
| *H04W 92/20* | (2009.01) | |
| *H04W 16/32* | (2009.01) | |

(52) U.S. Cl.
CPC .......... *H04L 5/0064* (2013.01); *H04L 5/0073* (2013.01); *H04W 8/20* (2013.01); *H04W 16/08* (2013.01); *H04W 28/16* (2013.01); *H04W 52/18* (2013.01); *H04W 72/04* (2013.01); *H04W 74/002* (2013.01); *H04L 5/0007* (2013.01); *H04L 5/0035* (2013.01); *H04L 5/0092* (2013.01); *H04W 16/32* (2013.01); *H04W 88/02* (2013.01); *H04W 88/08* (2013.01); *H04W 88/12* (2013.01); *H04W 92/20* (2013.01); *Y02B 60/50* (2013.01)

(58) Field of Classification Search
USPC .......................................... 370/329
See application file for complete search history.

(56) References Cited

U.S. PATENT DOCUMENTS

| | | | | |
|---|---|---|---|---|
| 2009/0290541 | A1* | 11/2009 | Nishio | H04L 1/0004 370/328 |
| 2009/0290550 | A1 | 11/2009 | Bhattad et al. | |
| 2010/0136998 | A1 | 6/2010 | Lott et al. | |
| 2010/0173637 | A1 | 7/2010 | Damnjanovic et al. | |
| 2011/0105138 | A1 | 5/2011 | Morimoto et al. | |
| 2011/0249642 | A1 | 10/2011 | Song et al. | |
| 2012/0046030 | A1* | 2/2012 | Siomina | G01S 5/00 455/423 |
| 2012/0100854 | A1 | 4/2012 | Hanaoka | |
| 2012/0147826 | A1* | 6/2012 | Teck | H04W 52/244 370/329 |
| 2012/0155362 | A1* | 6/2012 | Montojo | H04W 72/082 370/312 |
| 2013/0136074 | A1* | 5/2013 | Okino | H04W 24/00 370/329 |
| 2013/0229940 | A1* | 9/2013 | Baker | H04W 24/10 370/252 |
| 2013/0315092 | A1* | 11/2013 | Yu | H04W 52/0216 370/252 |
| 2013/0329636 | A1* | 12/2013 | Jiang | H04W 48/16 370/328 |
| 2016/0113020 | A1* | 4/2016 | Zhang | H04W 72/0406 370/329 |

OTHER PUBLICATIONS

3GPP TSG RAN WG1 Meeting #60bis Beijing, China Apr. 12-16, 2010; R1-102363; Agenda item: 6.8 Enhanced ICIC for Non-CA based Deployments of Heterogeneous Networks for LTE; Kyocera; "Range Expansion Performance and Interference Management for Control Channels in Outdoor Hotzone Scenario"; pp. 1-13.

3GPP TSG-RAN WG1 #60 San Francisco, CA; Feb. 22-26, 2010; R1-101506; Agenda item: 8.2.2; Qualcomm Incorporated; "Importance of Serving Cell Selection in Heterogeneous Networks"; pp. 1-5.

T.Nakayama et al.; "A study on serving cell selection scheme for LTE-Advanced heterogeneous network deployment"; IEICE Technical Report; RCS2009-324, vol. 109, No. 440; The Institue of Electronics, Information and Communication Engineers; Feb. 24, 2010; pp. 391-396.

International Search Report; PCT/JP2011/078537; dated Feb. 28, 2012.

Japanese Office Action; JP Application No. 2014-205614; dated Nov. 18, 2014.

\* cited by examiner

FIG. 2
(a)
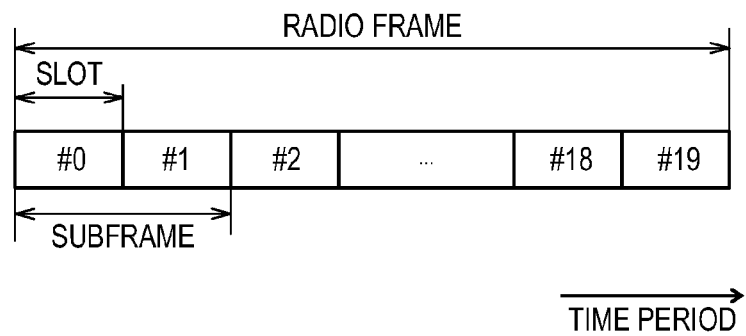
(b)
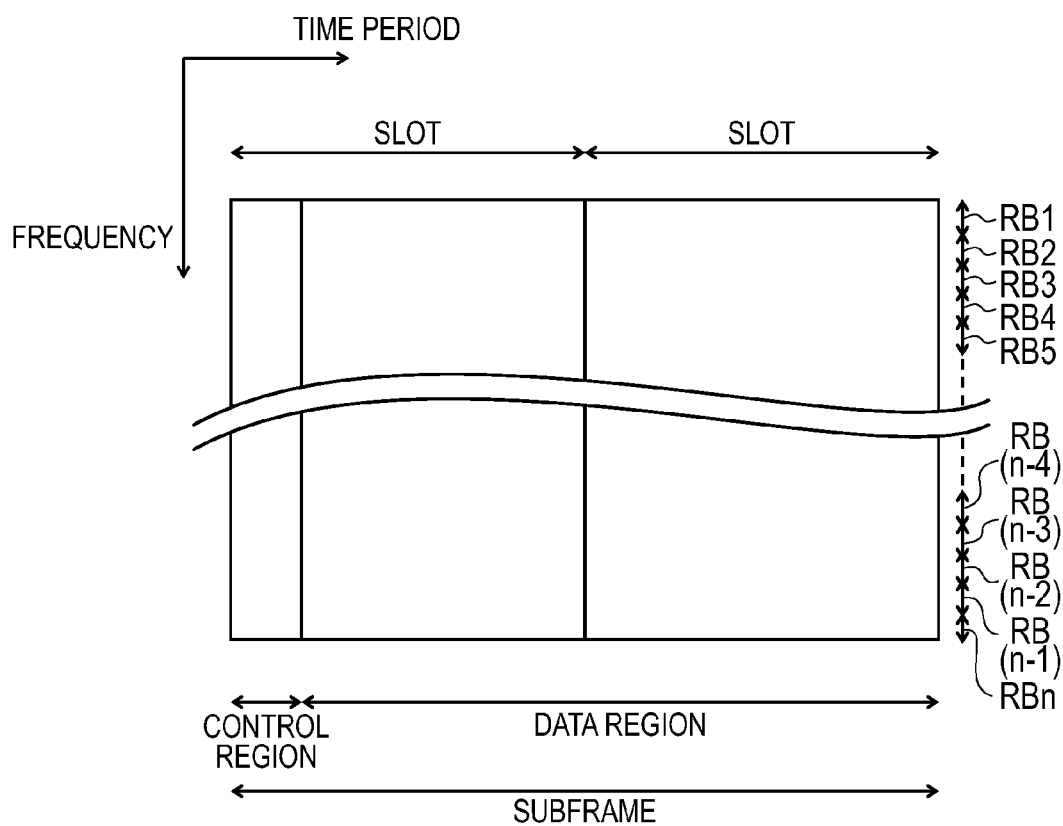

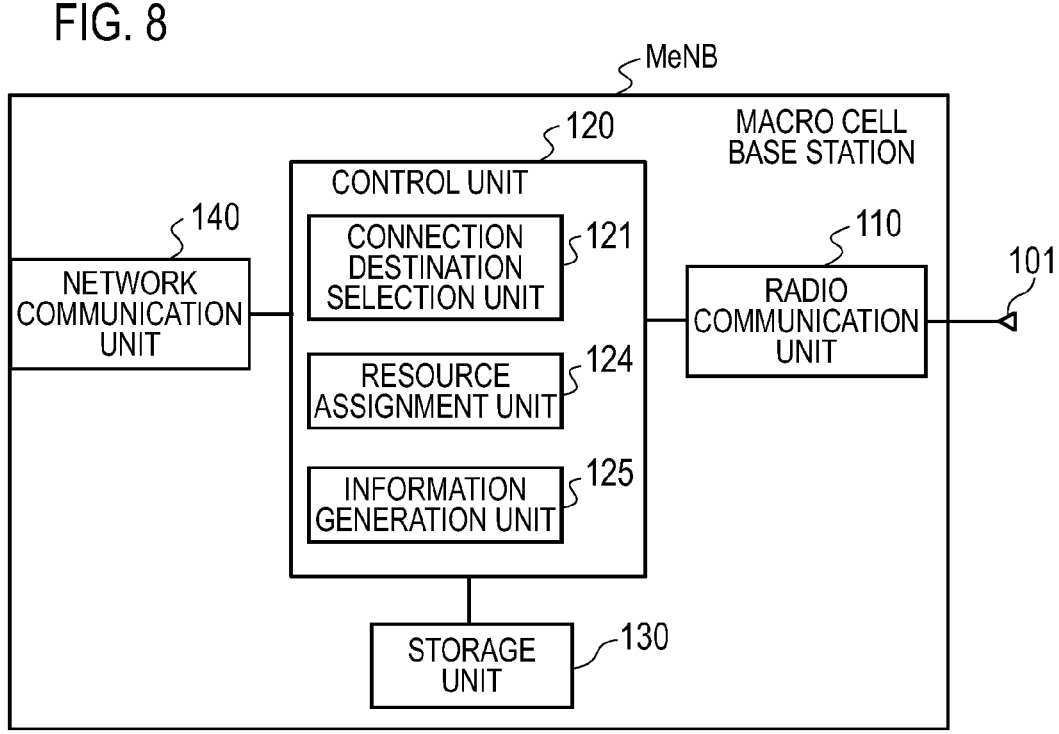
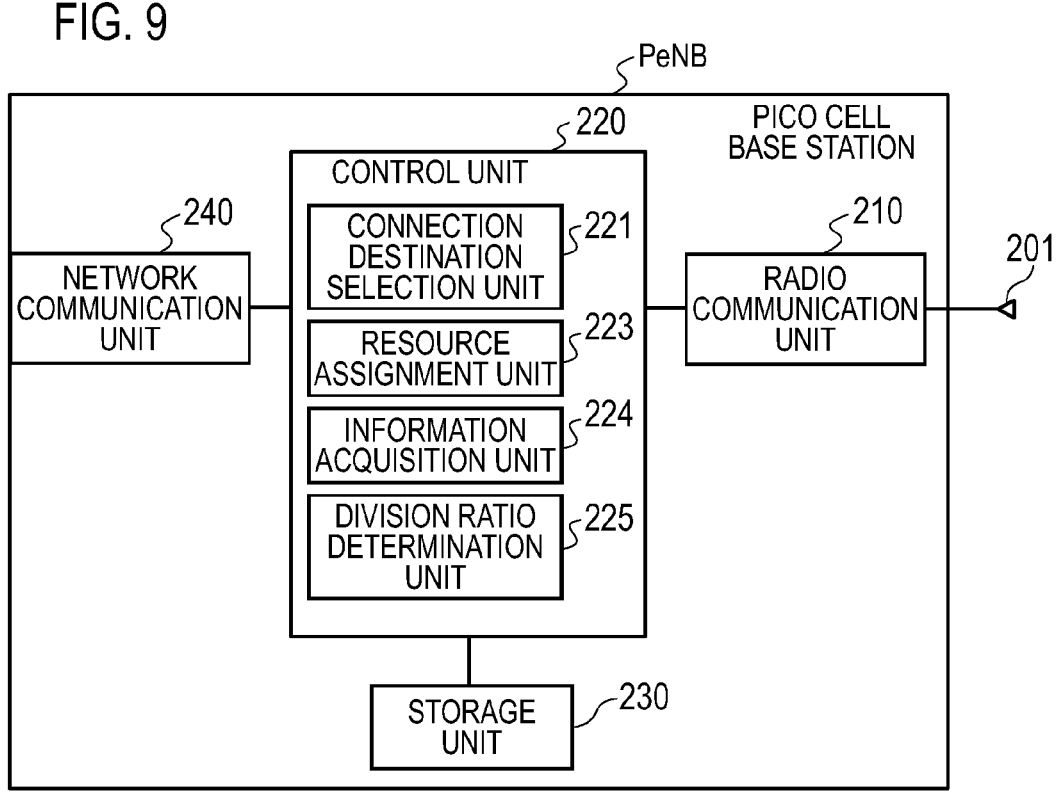

RESOURCE ALLOCATION SYSTEM AND CONTROL METHOD

TECHNICAL FIELD

The present invention relates to a radio communication system applied to a heterogeneous network, a base station, and a control method of the base station.

BACKGROUND ART

As a next-generation system for performing high speed communication with high capacity, as compared with the 3rd-generation and 3.5th-generation cellular radio communication systems operated at present, there are LTE (Long Term Evolution), which is standardized by 3GPP (3rd Generation Partnership Project) of a standardization body, and LTE Advanced which is a sophisticated version of LTE.

In a downlink of an LTE system (including LTE Advanced), a base station transmits user data to a radio terminal using a data transmission channel called PDSCH (Physical Downlink Shared Channel). In addition, the downlink indicates communication toward the radio terminal from the base station, and an uplink indicates communication toward the base station from the radio terminal.

Furthermore, in LTE Advanced, it is discussed to provide a heterogeneous network, that is a network in which a low power base station (so-called a pico cell base station, a femto cell base station, or a relay node) is located in a communication area of a high power base station (so-called a macro cell base station). In the heterogeneous network, it is possible to distribute a load of the high power base station to the low power base station.

However, since it is general that a radio terminal is connected to a base station, which has the highest received power of a radio signal among a plurality of base stations, it is probable that a connection opportunity of the radio terminal to a low power base station with low transmission power is reduced in the heterogeneous network.

In this regard, there has been proposed a technique of expanding a coverage (a communication area range) of a low power base station by controlling a radio terminal to be connected to the low power base station even though received power from the low power base station is not highest (for example, refer to Non Patent Literature 1).

CITATION LIST

Non Patent Literature

Non Patent Literature 1: 3GPP R1-093433 "Importance of Serving Cell Selection in Heterogeneous Networks" February, 2010.

SUMMARY OF THE INVENTION

However, when radio resources used as data transmission channels between neighboring base stations overlap each other, since a data transmission channel of one base station receives interference from a data transmission channel of the other base station, it is probable that it is not possible to normally receive user data through the data transmission channel of the one base station.

Particularly, in the technique of expanding the coverage of the low power base station in the heterogeneous network, since it is highly probable that a data transmission channel of the low power base station receives significant interference from a data transmission channel of the high power base station, the aforementioned problem becomes more critical.

Therefore, it is an object of the present invention to provide a radio communication system, a base station, and a control method of the base station, with which it is possible to reduce inter-base station interference in a heterogeneous network and to improve the throughput of the entire system.

In order to solve the aforementioned problem, the present invention has following characteristics. First, the characteristic of the radio communication system according to the present invention is summarized as follows. A radio communication system (radio communication system 1) comprising: a high power base station (e.g., macro cell base station MeNB); and a low power base station (e.g., pico cell base station PeNB) provided in a communication area of the high power base station and having transmission power lower than transmission power of the high power base station, comprises: a division ratio determination unit (division ratio determination unit 123 or division ratio determination unit 225) that determines a resource division ratio with respect to radio resources to be used as a specific downlink channel (e.g., PDSCH) by the high power base station, the resource division ratio indicating a ratio of first radio resources (e.g., macro cell usable PDSCH resources or macro cell normal power PDSCH resources) and second radio resources (e.g., macro cell unusable PDSCH resources or macro cell normal power PDSCH resources), the transmission power of the low power base station for second radio resources being limited to be lower than that for the first radio resources, wherein the division ratio determination unit determines the resource division ratio according to expected throughput of a high power-side deteriorated terminal having a deteriorated reception state, and expected throughput of a low power-side deteriorated terminal having a deteriorated reception state, the high power-side deteriorated terminal being a radio terminal connected to the high power base station, the low power-side deteriorated terminal being a radio terminal connected to the low power base station. Here, the specific downlink channel is, for example, a downlink data transmission channel (PDSCH in the LTE system). However, the specific downlink channel may also be a downlink control information transmission channel (PDCCH in the LTE system) as well as such a data transmission channel. Furthermore, the low power base station is, for example, a pico cell base station or a femto cell base station. However, the low power base station may also be a relay node or the like as well as the pico cell base station or the femto cell base station.

In accordance with the radio communication system according to the aforementioned characteristic, with respect to the radio resources to be used as the specific downlink channel of the high power base station, the first radio resources and the second radio resources are provided, the transmission power of the high power base station for the second radio resources being limited to be lower than the first radio resources. Since interference from the high power base station for the second radio resources is reduced, it is possible to improve the throughput of the low power-side deteriorated terminal by assigning the second radio resources to the low power-side deteriorated terminal. Furthermore, by determining the resource division ratio according to the throughput of the high power-side deteriorated terminal and the throughput of the low power-side deteriorated terminal, it is possible, for example, to equalize the throughput of cell edge terminals of each of the high power base station and the low power base station, resulting in the improvement of the throughput of the entire system.

Another characteristic of the radio communication system according to the present invention is summarized as follows. In the radio communication system according to the aforementioned characteristic, the division ratio determination unit determines the resource division ratio such that the expected throughput of the high power-side deteriorated terminal is equal to the expected throughput of the low power-side deteriorated terminal.

Another characteristic of the radio communication system according to the present invention is summarized as follows. In the radio communication system according to the aforementioned characteristic, the expected throughput of the high power-side deteriorated terminal is determined on the basis of a load level of the high power base station and expected unit throughput corresponding to a reception quality level of the high power-side deteriorated terminal, and the expected throughput of the low power-side deteriorated terminal is determined on the basis of a load level of the low power base station and expected unit throughout corresponding to a reception quality level of the low power-side deteriorated terminal.

Another characteristic of the radio communication system according to the present invention is summarized as follows. In the radio communication system according to the aforementioned characteristic, a load level of the high power base station indicates the number of radio terminals connected to the high power base station, and a load level of the low power base station indicates the number of radio terminals connected to the low power base station.

Another characteristic of the radio communication system according to the present invention is summarized as follows. In the radio communication system according to the aforementioned characteristic, the low power-side deteriorated terminal includes a first low power-side deteriorated terminal to which the first radio resource is assigned, and a second low power-side deteriorated terminal to which the second radio resource is assigned, and throughput of the low power-side deteriorated terminal is determined on the basis of the load level of the low power base station, expected unit throughput corresponding to a reception quality level of the first low power-side deteriorated terminal, and expected unit throughput corresponding to a reception quality level of the second low power-side deteriorated terminal.

Another characteristic of the radio communication system according to the present invention is summarized as follows. In the radio communication system according to the aforementioned characteristic, when the load level of the high power base station is set as #UEperM, the expected unit throughput corresponding to the reception quality level of the high power-side deteriorated terminal is set as $TP_{MUE}$, the load level of the low power base station is set as #UEperP, the expected unit throughput corresponding to the reception quality level of the first low power-side deteriorated terminal is set as $TP_{PUE1}$, and the expected unit throughput corresponding to the reception quality level of the second low power-side deteriorated terminal is set as $TP_{PUE2}$, the division ratio determination unit determines a ratio α of the first radio resource to radio resources to be used as the specific downlink channel by using the calculation equation:

$$\alpha = \frac{TP_{PUE2} \cdot \#UEperM}{TP_{MUE} \cdot \#UEperP + (TP_{PUE2} - TP_{PUE1}) \cdot \#UEperM} \quad [\text{Math. 1}]$$

or a calculation equation equivalent to the calculation equation.

Another characteristic of the radio communication system according to the present invention is summarized as follows. In the radio communication system according to the aforementioned characteristic, when a plurality of the low power base stations are provided in the communication area of the high power base station, the division ratio determination unit uses an average value or a maximum value of load levels of the low power base stations as the load level of the low power base station.

Another characteristic of the radio communication system according to the present invention is summarized as follows. The radio communication system according to the aforementioned characteristic, further comprises: a resource assignment unit (resource assignment unit 124) that assigns a radio resource to a radio terminal connected to the high power base station, wherein the first radio resource is a radio resource usable by the high power base station (e.g., macro cell usable PDSCH resources), the second radio resource is a radio resource unusable by the high power base station (e.g., macro cell unusable PDSCH resources), and the resource assignment unit assigns a radio resource of the first radio resources, which are determined according to the resource division ratio determined by the division ratio determination unit, to the radio terminal connected to the high power base station.

Another characteristic of the radio communication system according to the present invention is summarized as follows. The radio communication system according to the aforementioned characteristic, further comprises: a resource assignment unit (resource assignment unit 124) that assigns a radio resource to a radio terminal connected to the high power base station, wherein the first radio resource is a radio resource in which transmission power of the high power base station is not limited (e.g., macro cell normal power PDSCH resources), the second radio resource is a radio resource in which the transmission power of the high power base station is limited (e.g., macro cell low power PDSCH resources), and the resource assignment unit assigns a radio resource of the first radio resources and the second radio resources, which are determined according to the resource division ratio determined by the division ratio determination unit, to the radio terminal connected to the high power base station.

Another characteristic of the radio communication system according to the present invention is summarized as follows. In the radio communication system according to the aforementioned characteristic, when a plurality of the low power base stations are provided in the communication area of the high power base station, the division ratio determination unit determines the division ratio on the basis of an average value or a maximum value of load levels of each of the low power base stations.

Another characteristic of the radio communication system according to the present invention is summarized as follows. In the radio communication system according to the aforementioned characteristic, the specific downlink channel is a data transmission channel for transmitting user data to the radio terminal.

Another characteristic of the radio communication system according to the present invention is summarized as follows. In the radio communication system according to the aforementioned characteristic, the second radio resources are at least a part of frequency bands of all frequency bands of a downlink, and the first radio resources correspond to remaining frequency bands of all the frequency bands of the downlink except for the partial frequency bands.

Another characteristic of the radio communication system according to the present invention is summarized as follows. In the radio communication system according to the aforementioned characteristic, each of the partial frequency bands and the remaining frequency bands is an integer times of a frequency unit by which the radio terminal measures a reception quality level.

Another characteristic of the radio communication system according to the present invention is summarized as follows. In the radio communication system according to the aforementioned characteristic, the second radio resources are at least a part of a time range of a data region for transmitting user data to the radio terminal in a communication time frame of a downlink, and the first radio resources are a remaining time range of the data region except for the part of a time range.

The characteristic of a base station according to the present invention is summarized as follows. A base station comprises: a division ratio determination unit that determines a resource division ratio with respect to radio resources to be used as a specific downlink channel, the resource division ratio indicating a ratio of first radio resources and second radio resources, transmission power for the second radio resources being limited to be lower than that for the first radio resources, wherein the division ratio determination unit determines the resource division ratio according to expected throughput of a deteriorated terminal being a radio terminal connected to the base station and having a deteriorated reception state, and expected throughput of a deteriorated terminal being a radio terminal connected to a neighboring base station and having a deteriorated reception state.

The characteristic of a control method of a base station according to the present invention is summarized as follows. A control method of a base station, comprises: a step of determining a resource division ratio with respect to radio resources to be used as a specific downlink channel, the resource division ratio indicating a ratio of first radio resources and second radio resources, transmission power for the second radio resources being limited to be lower than that for the first radio resources, wherein in the step of determining, the resource division ratio is determined according to expected throughput of a deteriorated terminal being a radio terminal connected to the base station and having a deteriorated reception state, and expected throughput of a deteriorated terminal being a radio terminal connected to a neighboring base station and having a deteriorated reception state.

The present invention can provide a radio communication system, a base station, and a control method of the base station, with which it is possible to reduce inter-base station interference in a heterogeneous network and to improve the throughput of the entire system.

BRIEF DESCRIPTION OF THE DRAWINGS

FIG. 2 is a diagram illustrating a communication frame configuration in the LTE system.

FIG. 8 is a block diagram illustrating the configuration of the macro cell base station according to the second embodiment.

FIG. 9 is a block diagram illustrating the configuration of the pico cell base station according to the second embodiment.

DESCRIPTION OF THE EMBODIMENTS

Figure 1:
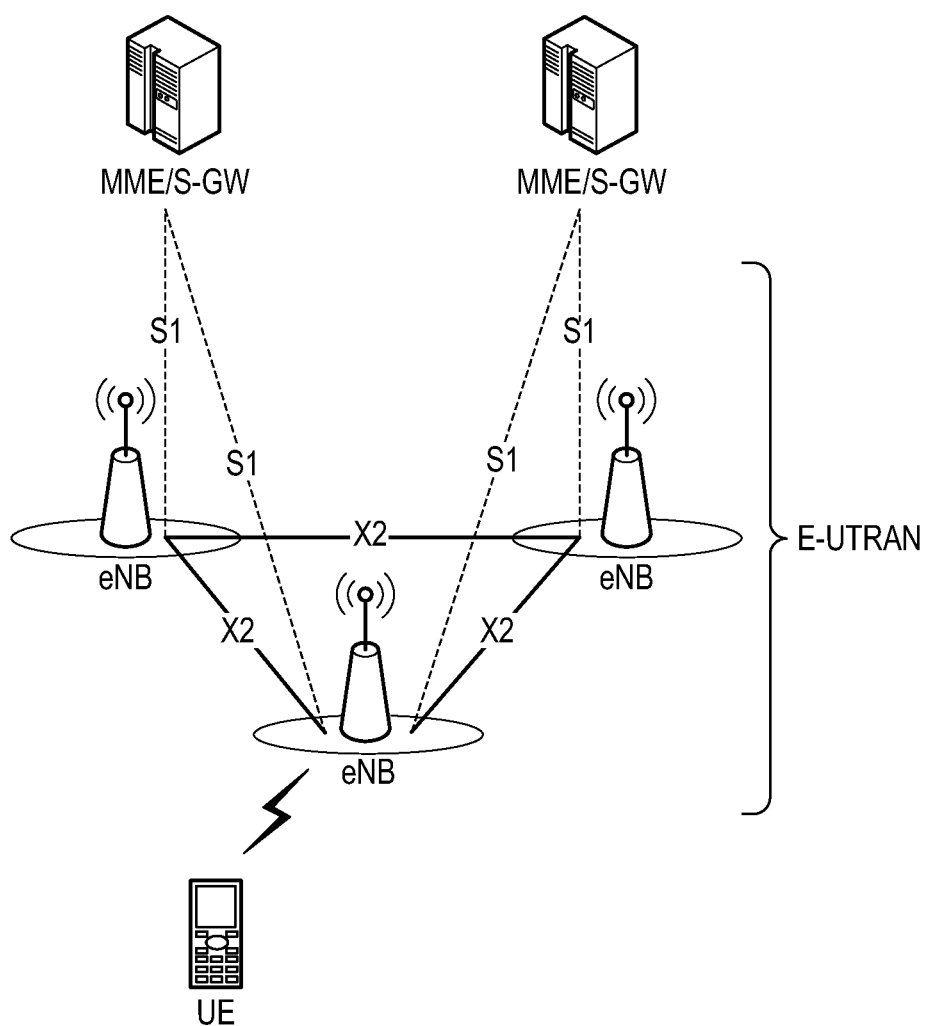
FIG. 1 is a diagram for explaining the overview of an LTE system according to the first embodiment to the third embodiment.

The first embodiment to the third embodiment and the other embodiments of the present invention will be described. In the drawings of each of the embodiments, the same or similar parts are provided with the same or similar reference signs.

[Overview of LTE System]

Before a description of the first embodiment to the third embodiment, the overview of an LTE system will be described while focusing on the content associated with the present invention.

FIG. 1 is a diagram for explaining the overview of an LTE system. As illustrated in FIG. 1, a plurality of base stations eNB constitute E-UTRAN (Evolved-UMTS Terrestrial Radio Access Network). Each of the plurality of base stations eNB forms a cell that is a communication area where a service should be provided to a radio terminal UE.

The radio terminal UE is a radio communication device carried by a user, and is also called as "User Equipment". The radio terminal UE is connected to a base station eNB, which has the highest received power of a reference signal (RSRP: Reference Signal Received Power) among the plurality of base stations eNB. However, as well as the RSRP, another reception quality indexes such as SNR (Signal-to-Noise ratio) may be used.

Each base station eNB is able to communicate mutually via an X2 interface which is a logical communication channel to provide inter-base station communication. Each of the plurality of base stations eNB is able to communicate with EPC (Evolved Packet Core), specifically, MME (Mobility Management Entity)/S-GW (Serving Gateway), via an S1 interface.

In radio communication between the base station eNB and the radio terminal UE, an OFDMA (Orthogonal Frequency Division Multiple Access) scheme is applied as a downlink multiplexing scheme and an SC-FDMA (Single-Carrier Frequency Division Multiple Access) scheme is applied as an uplink multiplexing scheme. Furthermore, an FDD (Frequency Division Duplex) scheme or a TDD (Time Division Duplex) scheme is applied as a duplex scheme.

FIG. 2(*a*) is frame configuration diagram illustrating a downlink radio frame configuration when the FDD scheme is used. FIG. 2(b) is a frame configuration diagram illustrating the configuration of a downlink sub-frame.

As illustrated in FIG. 2(a), the downlink radio frame consists of 10 downlink subfames, and each downlink subfame consists of two downlink slots. Each downlink subfame has a length of 1 ms and each downlink slot has a length of 0.5 ms. Furthermore, as illustrated in FIG. 2(b), each downlink slot includes seven OFDM symbols in a time axis direction (time domain), and includes a plurality of resource blocks (RB) in a frequency axis direction (frequency domain). Each RB includes 12 subcarriers.

As illustrated in FIG. 2(b), the downlink subfame includes two continuous downlink slots. A zone of up to three ODFM symbols from the head of a first downlink slot in the downlink subfame is a control region constituting a radio resource used as PDCCH (Physical Downlink Control Channel) for transmitting control information. The control information corresponds to uplink and downlink scheduling information (that is, information of an assignment radio resource) and the like. A zone of remaining ODFM symbols of the downlink subfame is a data region constituting a radio resource used as PDSCH (Physical Downlink Shared Channel) for transmitting user data. The radio terminal UE decodes the control information transmitted by the PDCCH, thereby designating user data transmitted by the PDSCH.

[First Embodiment]

Next, the first embodiment of the present invention will be described. In the first embodiment, a description will be provided for an example of an embodiment of a heterogeneous network arrangement in which a pico cell base station PeNB as a low power base station is provided in a communication area (a macro cell) of a macro cell base station MeNB as a high power base station.

In the first embodiment below, the description will be given in the order of (1) Configuration of radio communication system, (2) Interference control by resource division, (3) Configuration of macro cell base station, (4) Configuration of pico cell base station, (5) Operation of radio communication system, and (6) Effect of first embodiment.

Figure 3:
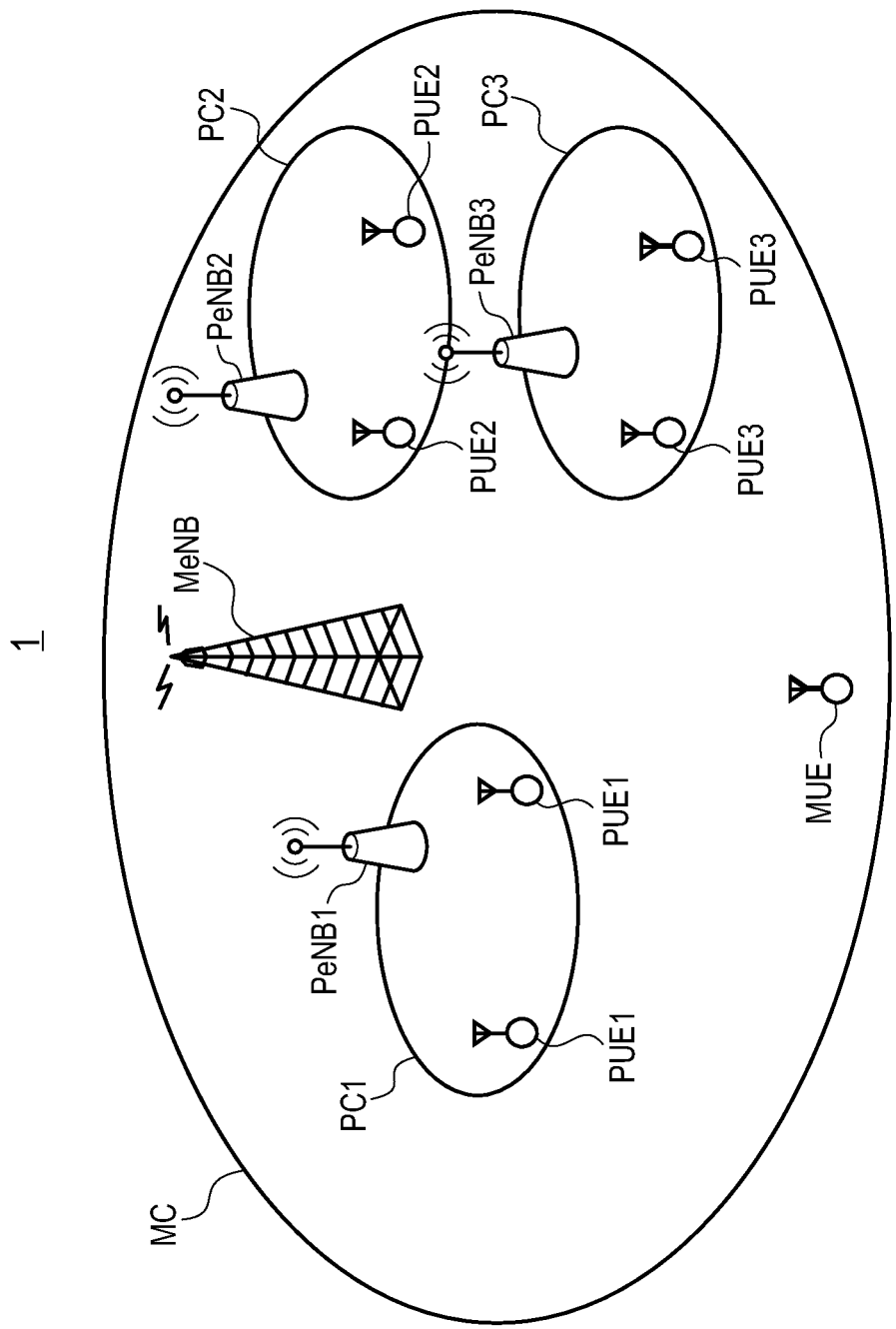
FIG. 3 is a schematic configuration diagram of a radio communication system according to the first embodiment.

(1) Configuration of Radio Communication System FIG. 3 is a schematic configuration diagram of a radio communication system 1 according to the first embodiment.

As illustrated in FIG. 3, the radio communication system 1 includes a macro cell base station MeNB (a high power base station or a large output base station), a radio terminal MUE connected to the macro cell base station MeNB, a pico cell base station PeNB (a low power base station or a small output base station) provided in a macro cell MC formed by the macro cell base station MeNB and adjacent to the macro cell base station MeNB, and a radio terminal PUE connected to the pico cell base station PeNB in a pico cell PC formed by the pico cell base station PeNB. The macro base station MeNB and the pico cell base station PeNB use a common frequency band. In the first embodiment, a plurality of pico cell base stations PeNB 1 to PeNB 3 are provided in the macro cell MC. In addition, the pico cell PC formed by the pico cell base station PeNB is appropriately called a "hot zone" hereinafter.

The pico cell base station PeNB (also called a hot zone node) is a low power base station having transmission power lower than that of the macro cell base station MeNB. Therefore, in the heterogeneous network, when employing a maximum received power reference (hereinafter, an RP reference) that is a connection destination selection reference in which the radio terminal UE selects and is connected to a base station eNB with the highest RSRP, the coverage of the pico cell base station PeNB may be small. Particularly, in a situation in which the position of the pico cell base station PeNB is near the macro cell base station MeNB, the coverage of the pico cell base station PeNB is significantly small, so that it is not possible to effectively utilize the pico cell base station PeNB.

As a method for expanding the coverage of the pico cell base station PeNB without an increase in the transmission power of the pico cell base station PeNB, the following two methods can be mainly employed.

Firstly, instead of the RP reference for selecting a base station eNB, which transmits a radio signal with the highest RSRP, as a connection destination of the radio terminal UE, there is a method for selecting a base station eNB, which has the lowest propagation loss (path loss) between the base station eNB and the radio terminal UE, as the connection destination of the radio terminal UE. In this way, for example, since a base station eNB nearest the radio terminal UE is selected as the connection destination, it is possible to expand the coverage of the pico cell base station PeNB. Such a connection destination selection reference is called a minimum path loss reference (hereinafter, a PL reference).

Secondly, there is a method in which a bias value (bias) is added to RSRP corresponding to the pico cell base station PeNB when the RSRP corresponding to the pico cell base station PeNB is compared with RSRP corresponding to the macro cell base station MeNB in the case in which the radio terminal UE is able to receive a radio signal from each of the macro cell base station MeNB and the pico cell base station PeNB. The bias is given to the RSRP corresponding to the pico cell base station PeNB, so that it is more likely that the RSRP after the offset exceeds the RSRP corresponding to the macro base station MeNB. Thus, since the pico cell base station PeNB is preferentially selected as the connection destination, it is possible to expand the coverage of the pico cell base station PeNB. Such a connection destination selection reference is called a Range Expansion reference (hereinafter, an RE reference). The bias value is shared by a pair of the macro cell base station MeNB and the pico cell base station PeNB. In addition, a difference between the transmission power of the macro cell base station MeNB and the transmission power of the pico cell base station PeNB (for example, 16 dB) can be set as the bias value, so that the RE reference is a connection destination selection reference equivalent to the PL reference.

In the first embodiment, the cell coverage of the pico cell base station PeNB is assumed to be expanded according to the RE reference. In addition, an entity for selecting the connection destination of the radio terminal UE is, for example, the radio terminal UE when the radio terminal UE is in a standby state (an idle state), and a base station eNB (a connection destination) when the radio terminal UE is performing communication (a connected state). In the connected state, since a measurement value of the RSRP is periodically reported to the base station eNB (the connection destination) from the radio terminal UE, the base station eNB (the connection destination) is able to select a next connection destination of the radio terminal UE, and perform handover of the radio terminal UE to the next connection destination.

According to the RE reference, a pico cell base station PeNB1 forms an expanded cell PC1, and radio terminals PUE1 are connected to the pico cell base station PeNB1 in the cell edge of the expanded cell PC1. Furthermore, according to the RE reference, a pico cell base station PeNB2 forms an expanded cell PC2, and radio terminals PUE2 are connected to the pico cell base station PeNB2 in the cell edge of the expanded cell PC2. Moreover, according to the RE reference, a pico cell base station PeNB3 forms an expanded cell PC3, and radio terminals PUE3 are connected to the pico cell base station PeNB3 in the cell edge of the expanded cell PC3.

Hereinafter, a radio terminal PUE located in the cell edge, that is, a radio terminal PUE having a deteriorated reception quality level is called a "pico cell-side deteriorated terminal PUE (a low power-side deteriorated terminal)". Furthermore, a radio terminal MUE located in the cell edge, that is, a radio terminal MUE having a deteriorated reception quality level is called a "macro cell-side deteriorated terminal MUE (a high power-side deteriorated terminal)". In addition, as the reception quality level, SINR (Signal-to-Interference and Noise power Ratio) is exemplified.

The macro base station MeNB transmits user data to the radio terminal MUE using the PDSCH. The pico cell base station PeNB transmits user data to the radio terminal PUE using the PDSCH. When frequency bands of these PDSCHs overlap each other, the PDSCHs of the macro cell base station MeNB and the pico cell base station PeNB are interfered with each other.

In the state in which the coverage of the pico cell base station PeNB is expanded, in the pico cell-side deteriorated terminal PUE, the received power from the macro cell base station MeNB may be higher than the received power from the pico cell base station PeNB. In this case, the PDSCH of the pico cell base station PeNB receives significant interference from the PDSCH of the macro cell base station MeNB, the radio terminal PUE is not able to receive (decode) user data.

(2) Interference Control by Resource Division

In the downlink of the heterogeneous network, when adding the bias according to the RE reference such that the coverage is expanded to be larger than the hot zone created according to the RP reference, interference power is larger than power of a desired signal according to the difference between the transmission power of the macro cell base station MeNB and the transmission power of the pico cell base station PeNB. Thus, a radio terminal UE not optimal in terms of SINR is accommodated in the hot zone. Since such a radio terminal UE basically receives significantly strong interference from a macro cell base station MeNB with high transmission power, SINR is significantly low. In this regard, in the first embodiment, interference control is performed by the following ICIC (ICIC: Inter-Cell Interference Coordination).

Figure 4:
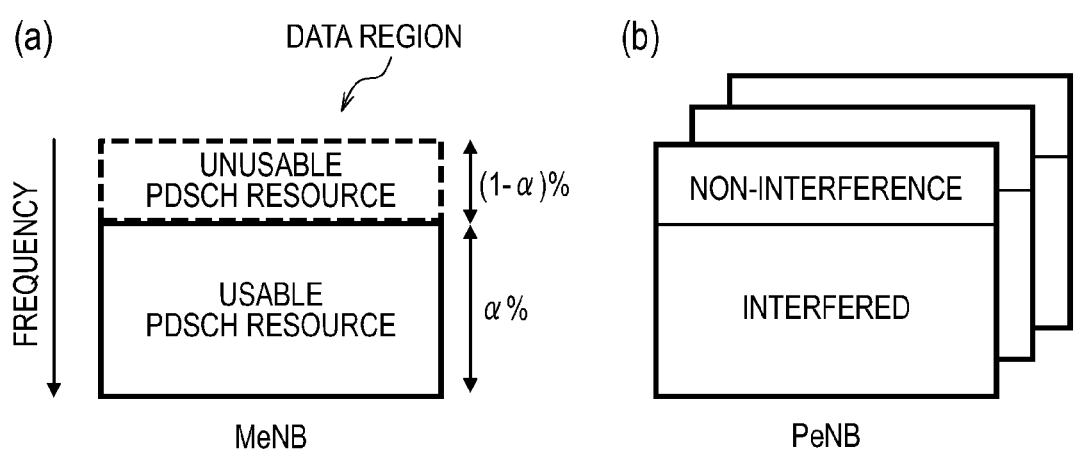
FIG. 4 is a diagram for explaining the ICIC according to the first embodiment.

FIG. 4 is a diagram for explaining the ICIC according to the first embodiment.

As illustrated in FIG. 4(a), PDSCH resources (corresponding to the data region illustrated in FIG. 2(b)) of the macro cell base station MeNB are frequency-divided and a part thereof is not used, so that the pico cell-side deteriorated terminal PUE is able to use the unused part. PDSCH resources unusable by the macro cell base station MeNB are called "macro cell unusable PDSCH resources", and PDSCH resources usable by the macro cell base station MeNB are called "macro cell usable PDSCH resources". In the first embodiment, the macro cell usable PDSCH resources are at least a part of all resource blocks of a downlink, and the macro cell unusable PDSCH resources are remaining resource blocks of all the resource blocks of the downlink, except for the partial resource blocks. Furthermore, in the first embodiment, the macro cell usable PDSCH resources correspond to first radio resources and the macro cell unusable PDSCH resources correspond to second radio resources.

As illustrated in FIG. 4(b), since the macro cell unusable PDSCH resource does not receive interference from the macro cell base station MeNB, each pico cell base station PeNB assigns the macro cell unusable PDSCH resource to a pico cell-side deteriorated terminal PUE connected thereto. In addition, since the radio terminal PUE periodically feeds back a measurement result of reception quality to the pico cell base station PeNB as channel quality information (CQI), each pico cell base station PeNB is able to preferentially assign a non-interference PDSCH resource to the pico cell-side deteriorated terminal PUE according to the fact that CQI corresponding to the non-interference PDSCH resource is good.

In the ICIC by such frequency division, instead of avoiding interference to the hot zone, the macro cell usable PDSCH resources usable by the radio terminal MUE connected to the macro cell base station MeNB are reduced. In this regard, for the improvement of characteristics by the expansion of the coverage of the hot zone, a characteristic improvement effect by load distribution needs to exceed loss due to the reduction of usable resources by the frequency division. Furthermore, in order to reliably improve the throughput of the pico cell-side deteriorated terminal PUE, it is necessary to consider how low the SINR of the pico cell-side deteriorated terminal PUE is (that is, how large the applied bias value is).

In this regard, in the first embodiment, the macro cell base station MeNB determines a resource division ratio according to expected throughput of the macro cell-side deteriorated terminal MUE and expected throughput of the pico cell-side deteriorated terminal PUE. Specifically, the macro cell base station MeNB determines the resource division ratio such that the expected throughput of the macro cell-side deteriorated terminal MUE is equal to the expected throughput of the pico cell-side deteriorated terminal PUE.

The expected throughput of the macro cell-side deteriorated terminal MUE is determined on the basis of a load level of the macro cell base station MeNB, and expected unit throughput corresponding to SINR of the macro cell-side deteriorated terminal MUE. The expected throughput of the pico cell-side deteriorated terminal PUE is determined on the basis of a load level of the pico cell base station PeNB, and expected unit throughput corresponding to SINR of the pico cell-side deteriorated terminal PUE.

The load level indicates the number of radio terminals in a connected state. Thus, the load level of the pico cell base station PeNB indicates the number of radio terminals PUE connected to the pico cell base station PeNB, and the load level of the macro cell base station MeNB indicates the number of radio terminals MUE connected to the macro cell base station MeNB. When a plurality of pico cell base stations PeNB are provided in the same macro cell as is the case with the example of FIG. 1, an average value or a maximum value of the number of radio terminals PUE that are connected to each pico cell base station PeNB is used as the load level of the pico cell base station PeNB.

The expected unit throughput indicates throughput per one resource block, which is provided in a modulation and coding scheme (MCS) according to SINR. As the SINR is better, MCS with a larger modulation level is larger a lower coding rate is used, so that the expected unit throughput is larger. Meanwhile, as the SINR is worse, MCS with a smaller modulation level and a higher coding rate is used, so that the expected unit throughput is smaller.

In the first embodiment, the pico cell-side deteriorated terminal PUE includes a first pico cell-side deteriorated terminal PUE to which the macro cell usable PDSCH resource is assigned, and a second pico cell-side deteriorated terminal PUE to which the macro cell unusable PDSCH resource is assigned. Therefore, the expected throughput of the pico cell-side deteriorated terminal PUE is determined on the basis of the number of terminals connected to the pico cell base station PeNB, expected unit throughput corresponding to the first pico cell-side deteriorated terminal PUE, and expected unit throughput corresponding to the second pico cell-side deteriorated terminal PUE.

When the number of terminals connected to the macro cell base station MeNB is set as #UEperM, the expected unit throughput corresponding to the SINR of the macro cell-side deteriorated terminal MUE is set as $TP_{MUE}$, the number of terminals connected to the pico cell base station PeNB is set as #UEperP, the expected unit throughput corresponding to the SINR of the first pico cell-side deteriorated terminal PUE is set as $TP_{PUE1}$, and the expected unit throughput corresponding to the SINR of the second pico cell-side deteriorated terminal PUE is set as $TP_{PUE2}$, the macro cell base station MeNB calculates the ratio α (refer to FIG. 4(a)) of the macro cell usable PDSCH resources to radio resources to be used as PDSCH on the basis of a calculation equation expressed by the following:

[Math. 2]

$$\frac{TP_{MUE} \cdot \alpha}{\#UEperM} = \frac{TP_{PUE1} \cdot \alpha + TP_{PUE2} \cdot (1-\alpha)}{\#UEperP} \quad (1)$$

In Math. 2, the left side corresponds to the expected throughput of the macro cell-side deteriorated terminal MUE, and the right side of the Math. 2 corresponds to the expected throughput of the pico cell-side deteriorated terminal PUE. By converting Equation (1), the following Equation (2) is obtained.

[Math. 3]

$$\alpha = \frac{TP_{PUE2} \cdot \#UEperM}{TP_{MUE} \cdot \#UEperP + (TP_{PUE2} - TP_{PUE1}) \cdot \#UEperM} \quad (2)$$

The resource division ratio may be arbitrarily set. However, according to the LTE specifications, the resources are divided according to the resolution of CQI fed back from the radio terminal UE. That is, the respective frequency bands of the macro cell usable PDSCH resource and the frequency band of the macro cell unusable PDSCH resource are an integer times of a frequency unit by which the radio terminal UE measures reception quality (channel quality). The frequency unit is called a sub-band (Subband). When the frequency band of the macro cell unusable PDSCH resource is set as m (=1−α) and the frequency band of the macro cell usable PDSCH resource is set as n (=α), the number RB of resource blocks of the macro cell usable PDSCH resource is expressed by the following Equation (3).

[Math. 4]

$$RB = SubbandSize \cdot \left\lfloor N_{RB} \cdot \frac{n}{(m+n)} \cdot \frac{1}{SubbandSize} \right\rfloor \quad (3)$$

In this case, the SubbandSize indicates the size (resolution) of CQI that is fed back, and the $N_{RB}$ indicates the total number RB of downlink frequency bands.

(3) Configuration of Macro Cell Base Station

Figure 5:
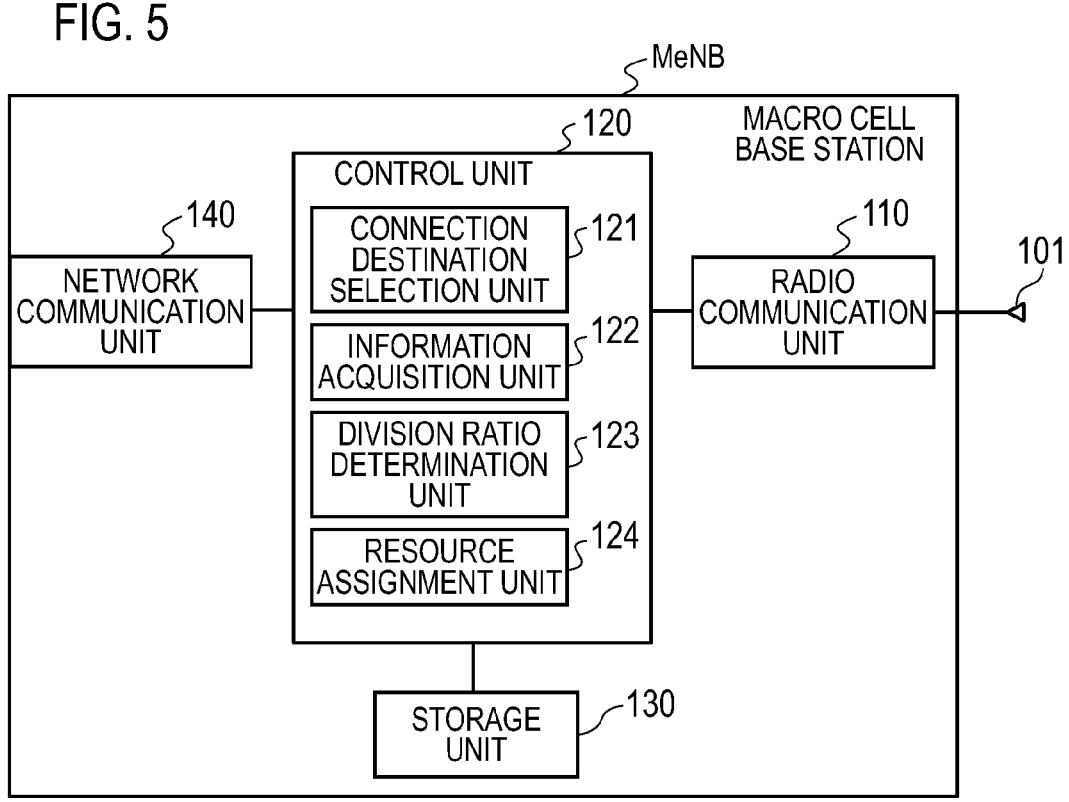
FIG. 5 is a block diagram illustrating the configuration of the macro cell base station according to the first embodiment.

Next, the configuration of the macro cell base station MeNB will be described. FIG. 5 is a block diagram illustrating the configuration of the macro cell base station MeNB according to the first embodiment.

As illustrated in FIG. 5, the macro cell base station MeNB includes an antenna 101, a radio communication unit 110, a control unit 120, a storage unit 130, and a network communication unit 140.

The radio communication unit 110, for example, is configured using a radio frequency (RF) circuit, a baseband (BB) circuit and the like, and performs transmission/reception of a radio signal with the radio terminal MUE through the antenna 101. Furthermore, the radio communication unit 110 performs modulation of a transmission signal and demodulation of a reception signal.

The control unit 120 is configured, for example, using a CPU, and controls various functions provided in the macro cell base station MeNB. The storage unit 130 is configured, for example, using a memory, and stores various types of information used for the control and the like of the macro cell base station MeNB. The storage unit 130 stores a bias value of each pico cell base station PeNB. The network communication unit 140 performs inter-base station communication with another base station using an X2 interface.

The control unit 120 includes a connection destination selection unit 121, an information acquisition unit 122, a division ratio determination unit 123, and a resource assignment unit 124.

The connection destination selection unit 121 selects a base station, which is a next connection destination of the radio terminal MUE, on the basis of information (that is, a measurement report) of RSRP reported from the radio terminal MUE connected to the macro cell base station MeNB. In the case in which the radio terminal MUE receives a reference signal from each of the macro cell base station MeNB and the pico cell base station PeNB, when $RSRP_{MeNB}$ corresponding to the macro cell base station MeNB is compared with $RSRP_{PeNB}$ corresponding to the pico cell base station PeNB, the connection destination selection unit 121 applies bias to the $RSRP_{PeNB}$. When the biased $RSRP_{PeNB}$ is higher than the $RSRP_{MeNB}$, the connection destination selection unit 121 performs handover control such that a connection destination of the radio terminal MUE is switched to the pico cell base station PeNB.

The information acquisition unit 122 acquires the number #UEperM of terminals connected to the macro cell base station MeNB, the expected unit throughput $TP_{MUE}$ corresponding to the SINR of the macro cell-side deteriorated terminal MUE, the number #UEperP of terminals connected to the pico cell base station PeNB, the expected unit throughput $TP_{PUE1}$ corresponding to the SINR of the first pico cell-side deteriorated terminal PUE, and the expected unit throughput $TP_{PUE2}$ corresponding to the SINR of the second pico cell-side deteriorated terminal PUE. The information acquisition unit 122 is able to acquire the number #UeperM of terminals connected to the macro cell base station MeNB using information managed by the resource assignment unit 124. Furthermore, the information acquisition unit 122 is able to acquire the number #UeperP of terminals connected to the pico cell base station PeNB using information on the number of connected terminals, which is received in the network communication unit 140 from the pico cell base station PeNB. For the expected unit throughput $TP_{MUE}$, $TP_{PUE1}$, and $TP_{PUE2}$, an expected value may be used or an actually measured value may be used. In the case of using the expected value, each of the expected unit throughput $TP_{MUE}$ and $TP_{PUE2}$ may be used as Shannon capacity in case of the SINR=0 [dB], and the expected unit throughput $TP_{PUE1}$ may be used as Shannon capacity in case of the SINR=−bias [dB].

The division ratio determination unit 123 determines the resource division ratio by using Equation (2) on the basis of the number #UeperM of connected terminals and the number #UeperP of connected terminals acquired by the information acquisition unit 122, and the expected unit throughput $TP_{MUE}$, $TP_{PUE1}$, and $TP_{PUE2}$ acquired by the information acquisition unit 122. In addition, in order to cope with a change in a communication situation, it is preferable that the division ratio determination unit 123 periodically updates the resource division ratio.

The resource assignment unit 124 assigns, to the radio terminal MUE, a radio resource (a resource block) of the macro cell usable PDSCH resources determined according to the resource division ratio determined by the division ratio determination unit 123, and Equation (3). For example, on the basis of the CQI that is fed back from the radio terminal MUE, the resource assignment unit 124 assigns the radio resource (the resource block) of the macro cell usable PDSCH resources to the radio terminal MUE using a scheduling algorithm such as proportional fairness (PF).

(4) Configuration of Pico Cell Base Station

Figure 6:
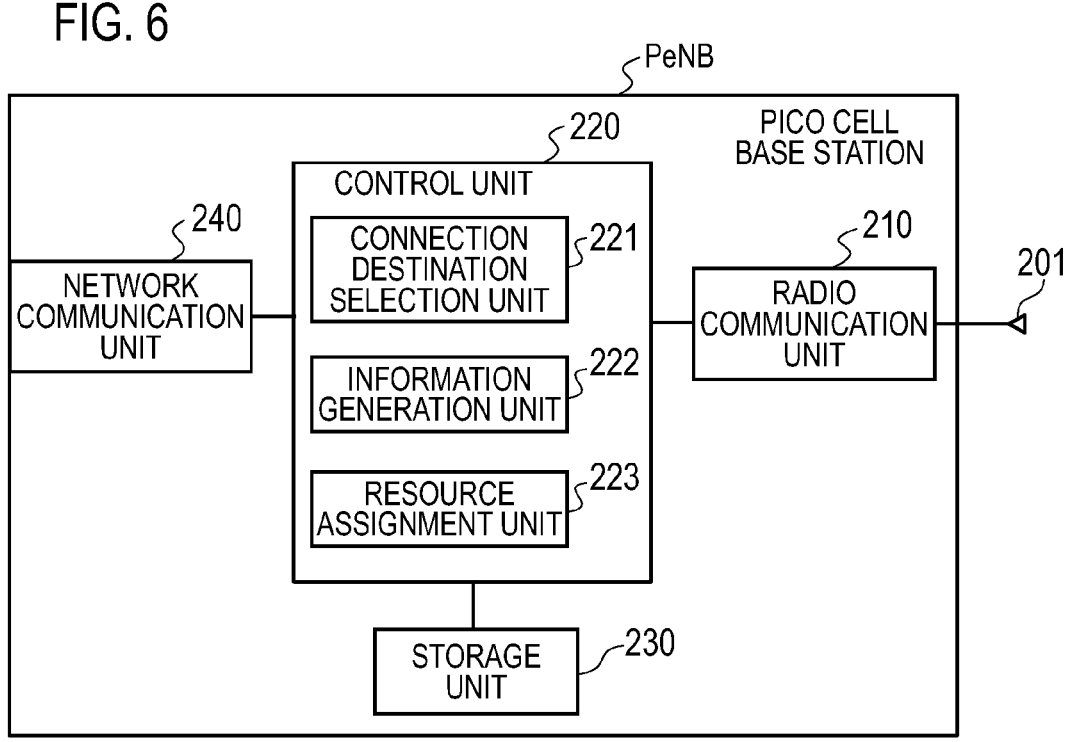
FIG. 6 is a block diagram illustrating the configuration of the pico cell base station according to the first embodiment.

Next, the configuration of the pico cell base station PeNB will be described. FIG. 6 is a block diagram illustrating the configuration of the pico cell base station PeNB according to the first embodiment.

As illustrated in FIG. 6, the pico cell base station PeNB includes an antenna 201, a radio communication unit 210, a control unit 220, a storage unit 230, and a network communication unit 240.

The radio communication unit 110 is configured, for example, using a radio frequency (RF) circuit, a baseband (BB) circuit and the like, and performs transmission/reception of a radio signal with the radio terminal PUE through the antenna 201. Furthermore, the radio communication unit 210 performs modulation of a transmission signal and demodulation of a reception signal.

The control unit 220 is configured, for example, using a CPU, and controls various functions provided in the pico cell base station PeNB. The storage unit 230 is configured, for example, using a memory, and stores various types of information used for the control and the like of the pico cell base station PeNB. The network communication unit 240 performs inter-base station communication with another base station using the X2 interface.

The control unit 220 includes a connection destination selection unit 221, an information generation unit 222, and a resource assignment unit 223.

The connection destination selection unit 221 selects a base station, which is a next connection destination of a radio terminal PUE, on the basis of RSRP reported from the radio terminal PUE connected to the pico cell base station PeNB. In the case in which the radio terminal PUE receives a reference signal from each of the macro cell base station MeNB and the pico cell base station PeNB, when the $RSRP_{MeNB}$ corresponding to the macro cell base station MeNB is compared with the $RSRP_{PeNB}$ corresponding to the pico cell base station PeNB, the connection destination selection unit 221 applies bias to the $RSRP_{PeNB}$. When the biased $RSRP_{PeNB}$ is lower than the $RSRP_{MeNB}$, the connection destination selection unit 221 performs handover control such that a connection destination of the radio terminal PUE is switched to the macro cell base station MeNB.

The information generation unit 222 generates connection terminal number information indicating the number of radio terminals PUE (the number #UeperP of connected terminals), which are connected to the pico cell base station PeNB, by using information managed by the resource assignment unit 223. The connection terminal number information generated by the information generation unit 222 is transmitted to the macro cell base station MeNB from the network communication unit 240.

The resource assignment unit 223 assigns a radio resource (a resource block) to the radio terminal PUE. For example, on the basis of the CQI that is fed back from the radio terminal PUE, the resource assignment unit 223 assigns the radio resource (the resource block) of the PDSCH resources to the radio terminal MUE using a scheduling algorithm such as proportional fairness (PF).

(5) Operation of Radio Communication System

Figure 7:
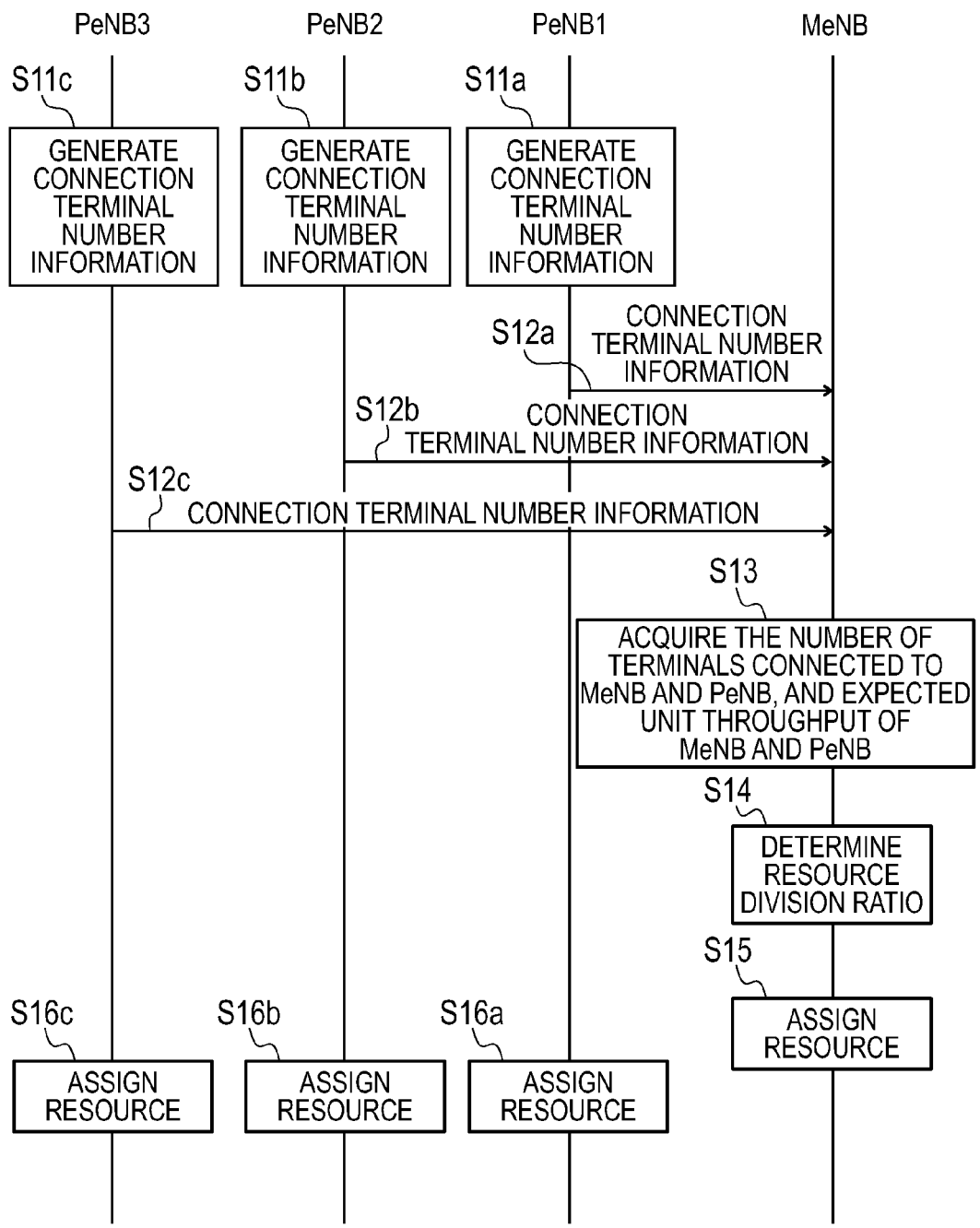
FIG. 7 is an operation sequence diagram illustrating the operation of the radio communication system according to the first embodiment.

FIG. 7 is an operation sequence diagram illustrating the operation of the radio communication system 1 according to the first embodiment. The sequence illustrated in FIG. 7 is periodically performed.

As illustrated in FIG. 7, in step S11*a*, the information generation unit 222 of the pico cell base station PeNB1 generates connection terminal number information indicating the number of radio terminals PUE connected to the pico cell base station PeNB1. In step S12*a*, the network communication unit 240 of the pico cell base station PeNB1 transmits the connection terminal number information to the macro cell base station MeNB. The network communication unit 140 of the macro cell base station MeNB receives the connection terminal number information.

In step S11*b*, the information generation unit 222 of the pico cell base station PeNB2 generates connection terminal number information indicating the number of radio terminals PUE connected to the pico cell base station PeNB2. In step S12*b*, the network communication unit 240 of the pico cell base station PeNB2 transmits the connection terminal number information to the macro cell base station MeNB. The network communication unit 140 of the macro cell base station MeNB receives the connection terminal number information.

In step S11*c*, the information generation unit 222 of the pico cell base station PeNB3 generates connection terminal number information indicating the number of radio terminals PUE connected to the pico cell base station PeNB3. In step S12*c*, the network communication unit 240 of the pico cell base station PeNB3 transmits the connection terminal number information to the macro cell base station MeNB. The network communication unit 140 of the macro cell base station MeNB receives the connection terminal number information.

In step S13, the information acquisition unit 122 of the macro cell base station MeNB acquires the number of terminals connected to each of the pico cell base stations PeNB1 to PeNB3 on the basis of the connection terminal number information received in the network communication unit 140, and acquires an average value or a maximum value of the number of terminals connected to each of the pico cell base stations PeNB1 to PeNB3 as the number #UeperP of connected terminals. Furthermore, the information acquisition unit 122 acquires the number #UeperM of terminals connected to the macro cell base station MeNB. Moreover, the information acquisition unit 122 acquires the expected unit throughput $TP_{MUE}$ and $TP_{PUE2}$ stored in the storage unit 130, and acquires the expected unit throughput $TP_{PUE1}$ on the basis of the bias value stored in the storage unit 130.

In step S14, the division ratio determination unit 123 of the macro cell base station MeNB determines the resource division ratio using Equation (2) on the basis of the number #UeperM of connected terminals and the number #UeperP of connected terminals acquired by the information acquisition unit 122, and the expected unit throughput $TP_{MUE}$, $TP_{PUE1}$, and $TP_{PUE2}$ acquired by the information acquisition unit 122.

In step S15, the resource assignment unit 124 of the macro cell base station MeNB assigns, to the radio terminal MUE, the radio resource (the resource block) of the macro cell usable PDSCH resources determined according to the resource division ratio determined by the division ratio determination unit 123, and Equation (3).

In step S16a, the resource assignment unit 223 of the pico cell base station PeNB1 assigns the radio resource (the resource block) to the radio terminal PUE connected to the pico cell base station PeNB1. Furthermore, since the macro cell unusable PDSCH resources do not receive interference from the macro cell base station MeNB, the resource assignment unit 223 assigns the macro cell unusable PDSCH resources to the pico cell-side deteriorated terminal PUE connected to the pico cell base station PeNB1. In addition, since the radio terminal PUE periodically feeds back CQI to the pico cell base station PeNB1, the pico cell base station PeNB1 is able to preferentially assign the macro cell unusable PDSCH resource to the pico cell-side deteriorated terminal PUE according to the fact that the CQI is good.

In step S16b, the resource assignment unit 223 of the pico cell base station PeNB2 assigns the radio resource (the resource block) to the radio terminal PUE connected to the pico cell base station PeNB2. Furthermore, since the macro cell unusable PDSCH resources do not receive interference from the macro cell base station MeNB, the resource assignment unit 223 preferentially assigns the macro cell unusable PDSCH resources to the pico cell-side deteriorated terminal PUE connected to the pico cell base station PeNB2.

In step S16c, the resource assignment unit 223 of the pico cell base station PeNB1 assigns the radio resource (the resource block) to the radio terminal PUE connected to the pico cell base station PeNB3. Furthermore, since the macro cell unusable PDSCH resources do not receive interference from the macro cell base station MeNB, the resource assignment unit 223 preferentially assigns the macro cell unusable PDSCH resources to the pico cell-side deteriorated terminal PUE connected to the pico cell base station PeNB3.

(6) Effect of First Embodiment

As described above, in accordance with the radio communication system 1 according to the first embodiment, with respect to radio resources to be used as the PDSCH by the macro cell base station MeNB, the macro cell usable PDSCH resources and the macro cell unusable PDSCH resources are provided. Since the macro cell unusable PDSCH resources do not receive interference from the macro cell base station MeNB, the macro cell unusable PDSCH resources are preferentially assigned to the pico cell-side deteriorated terminal PUE, resulting in the improvement of the throughput of the pico cell-side deteriorated terminal PUE. Furthermore, the resource division ratio is determined according to the throughput of the macro cell-side deteriorated terminal MUE and the throughput of the pico cell-side deteriorated terminal PUE, so that it is possible to equalize the throughput of deteriorated terminals (cell edge terminals) of each of the macro cell base station MeNB and the pico cell base station PeNB, resulting in the improvement of the throughput of the entire system.

In the first embodiment, since the division ratio determination unit 123 determines the resource division ratio on the basis of an average value or a maximum value of the number of connected terminals of each of a plurality of pico cell base stations PeNB, even when the plurality of pico cell base stations PeNB are provided in the communication area of the macro cell base station MeNB, it is possible to appropriately set the resource division ratio.

[Second Embodiment]

In the first embodiment, the macro cell base station MeNB determines the resource division ratio. However, in the second embodiment, the pico cell base station PeNB determines the resource division ratio. Hereinafter, differences from the first embodiment will be described and a redundant description will be omitted.

FIG. 8 is a block diagram illustrating the configuration of the macro cell base station MeNB according to the second embodiment.

As illustrated in FIG. 8, the macro cell base station MeNB according to the second embodiment includes an information generation unit 125, and does not include the information acquisition unit 122 and the division ratio determination unit 123 described in the first embodiment. The information generation unit 125 generates connection terminal number information (information on the number of radio terminals MUE connected to the macro cell base station MeNB).

FIG. 9 is a block diagram illustrating the configuration of the pico cell base station PeNB according to the second embodiment. As illustrated in FIG. 9, the pico cell base station PeNB according to the second embodiment includes an information acquisition unit 224 and a division ratio determination unit 225. The information acquisition unit 224 acquires connection terminal number information of each of the macro cell base station MeNB and the pico cell base station PeNB. The division ratio determination unit 225 determines a resource division ratio using the same method as that of the first embodiment on the basis of the connection terminal number information of each of the macro cell base station MeNB and the pico cell base station PeNB acquired by the information acquisition unit 224.

Figure 10:
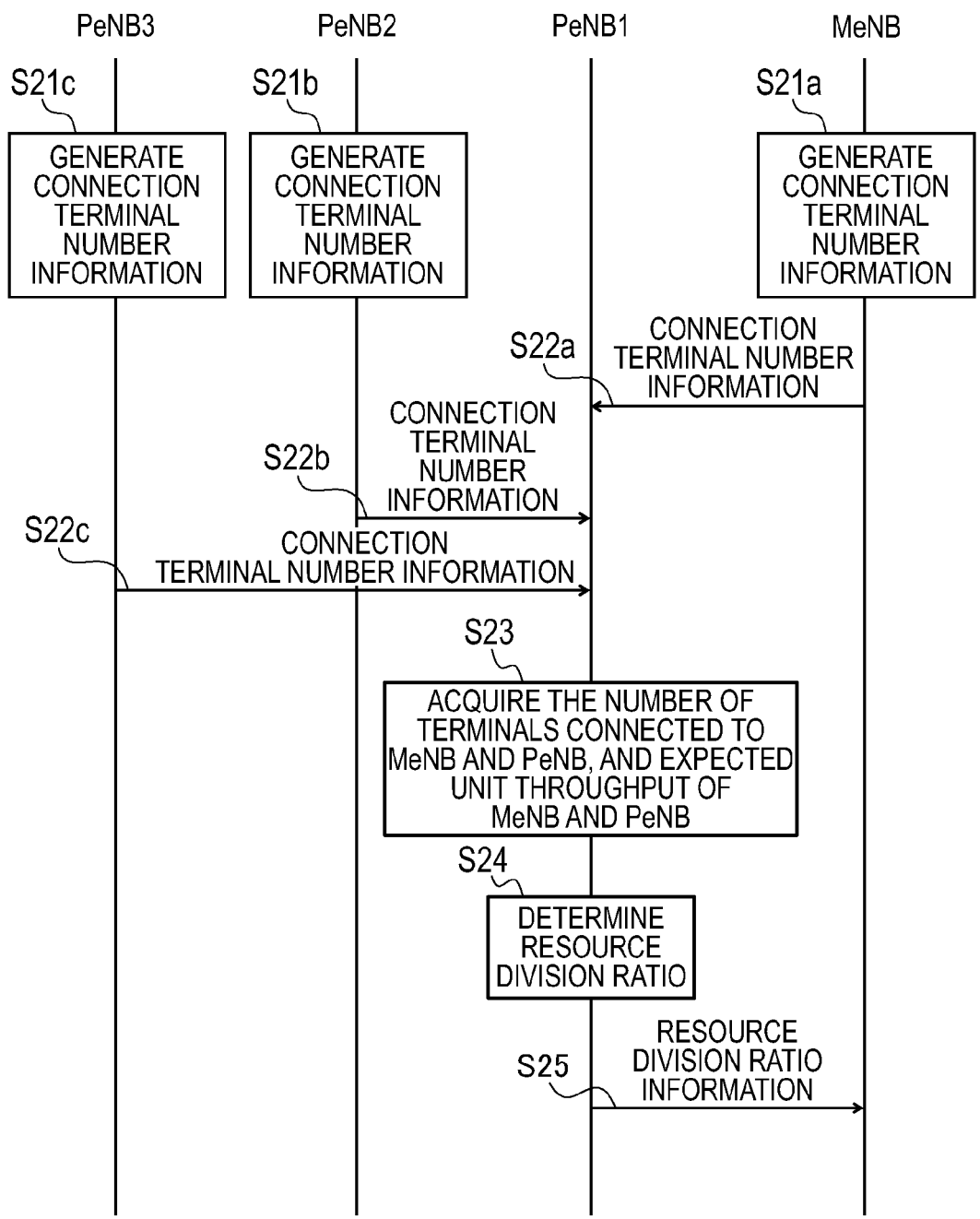
FIG. 10 is an operation sequence diagram illustrating the operation of the radio communication system according to the second embodiment.

FIG. 10 is an operation sequence diagram illustrating the operation of the radio communication system 1 according to the second embodiment. The operation sequence illustrated in FIG. 10 is periodically performed.

In step S21a, the information generation unit 125 of the macro cell base station MeNB generates the connection terminal number information indicating the number of radio terminals MUE connected to the macro cell base station MeNB. In step S22a, the network communication unit 140 of the macro cell base station MeNB transmits the connection terminal number information to the pico cell base station PeNB1. The network communication unit 240 of the pico cell base station PeNB1 receives the connection terminal number information.

In step S21b, the information generation unit 222 of the pico cell base station PeNB2 generates the connection terminal number information indicating the number of radio terminals PUE connected to the pico cell base station PeNB2. In step S22b, the network communication unit 240 of the pico cell base station PeNB2 transmits the connection terminal number information to the pico cell base station PeNB1. The network communication unit 240 of the pico cell base station PeNB1 receives the connection terminal number information.

In step S21c, the information generation unit 222 of the pico cell base station PeNB3 generates the connection terminal number information indicating the number of radio terminals PUE connected to the pico cell base station PeNB3. In step S22c, the network communication unit 240 of the pico cell base station PeNB3 transmits the connection terminal number information to the pico cell base station PeNB1. The network communication unit 240 of the pico cell base station PeNB1 receives the connection terminal number information.

In step S23, the information acquisition unit 224 of the pico cell base station PeNB1 acquires an average value or a maximum value of the number of terminals connected to each of the pico cell base stations PeNB1 to PeNB3 as the number #UeperP of connected terminals, and acquires the number #UeperM of terminals connected to the macro cell base station MeNB. Moreover, the information acquisition unit 224 acquires expected unit throughput $TP_{MUE}$ and $TP_{PUE2}$ stored in the storage unit 230, and acquires expected unit throughput $TP_{PUE1}$ on the basis of a bias value stored in the storage unit 230.

In step S24, the division ratio determination unit 225 of the pico cell base station PeNB1 determines the resource division ratio using Equation (2) on the basis of the number #UeperM of connected terminals and the number #UeperP of connected terminals acquired by the information acquisition unit 224, and the expected unit throughput $TP_{MUE}$, $TP_{PUE1}$, and $TP_{PUE2}$ acquired by the information acquisition unit 224.

In step S25, the network communication unit 240 of the pico cell base station PeNB1 transmits information, which indicates the resource division ratio determined by the division ratio determination unit 225, to the macro cell base station MeNB. The network communication unit 140 of the macro cell base station MeNB receives the information indicating the resource division ratio.

Then, the resource assignment unit 124 of the macro cell base station MeNB assigns, to the radio terminal MUE, a radio resource (a resource block) of the macro cell usable PDSCH resources determined according to the information received in the network communication unit 140 and indicating the resource division ratio.

As described above, according to the second embodiment, it is possible to obtain the same effects as those of the first embodiment.

[Third Embodiment]

In the first embodiment and the second embodiment, the PDSCH resources of the macro cell base station MeNB are frequency-divided into the macro cell unusable PDSCH resources unusable by the macro cell base station MeNB and the macro cell usable PDSCH resources usable by the macro cell base station MeNB.

In the third embodiment, the PDSCH resources of the macro cell base station MeNB are frequency-divided into macro cell low power PDSCH resources and macro cell normal power PDSCH resources. The macro cell low power PDSCH resources are usable by the macro cell base station MeNB, but are limited to have transmission power lower than that of the macro cell normal power PDSCH resources. In the third embodiment, the macro cell normal power PDSCH resources correspond to first radio resources and the macro cell low power PDSCH resources correspond to second radio resources.

Figure 11:
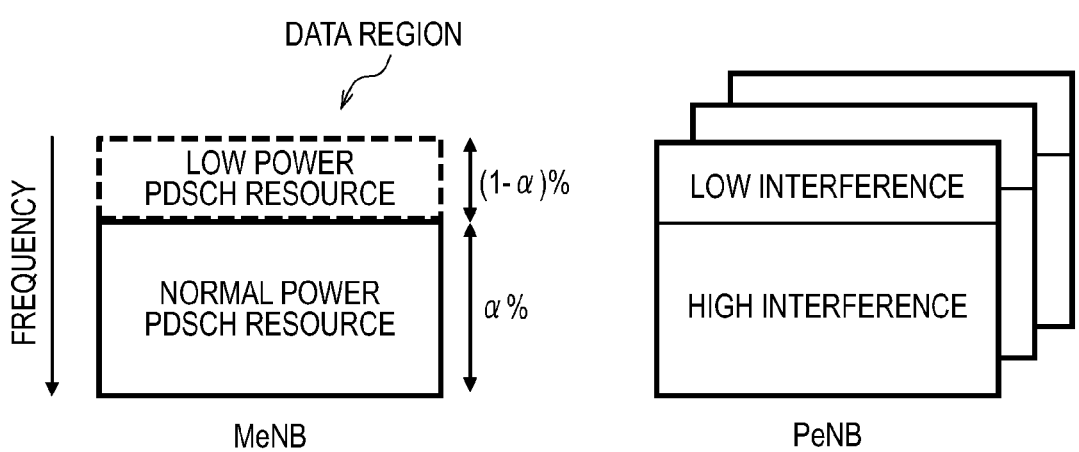
FIG. 11 is a diagram for explaining the ICIC according to the third embodiment.

FIG. 11 is a diagram for explaining ICIC according to the third embodiment. Mainly, differences from the first embodiment will be described.

As illustrated in FIG. 11, in the third embodiment, the macro cell normal power PDSCH resources are at least a part of all resource blocks of a downlink, and the macro cell low power PDSCH resources are the remaining resource blocks obtained of all the resource blocks of the downlink, except for the partial resource blocks.

Since the macro cell low power PDSCH resources receive low level interference from the macro cell base station MeNB, the pico cell base station PeNB assigns the PDSCH resources to a radio terminal PUE with a low SINR. Since the radio terminal PUE periodically feeds back a measurement result of reception quality to the pico cell base station PeNB as channel quality information (CQI), the pico cell base station PeNB is able to preferentially assign low interference PDSCH resources to the radio terminal PUE in response to the fact that CQI corresponding to the low interference PDSCH resources is good.

Furthermore, it is preferable that the macro cell base station MeNB assigns the macro cell low power PDSCH resources to a radio terminal MUE in the vicinity of the macro cell base station MeNB. Specifically, the resource assignment unit 124 of the macro cell base station MeNB assigns a radio resource (a resource block) of the macro cell low power PDSCH resources to a radio terminal MUE with good CQI corresponding to the macro cell low power PDSCH resources or a radio terminal MUE with small path loss between the radio terminal MUE and the macro cell base station MeNB. The resource assignment unit 124 assigns a radio resource (a resource block) of the macro cell normal power PDSCH resources to a radio terminal MUE with bad CQI corresponding to the macro cell low power PDSCH resources or a radio terminal MUE with large path loss between the radio terminal MUE and the macro cell base station MeNB.

In the third embodiment, similarly to the first embodiment, a resource division ratio, which indicates a ratio of the macro cell low power PDSCH resources and the macro cell normal power PDSCH resources, is determined using Equation (2). Furthermore, similarly to the first embodiment, the resource division ratio matches the resolution of the CQI that is fed back.

As described above, according to the third embodiment, the interference reduction effect of the pico cell base station PeNB is lower than the first embodiment. However, since PDSCH resources usable by the macro cell base station MeNB are increased as compared with the first embodiment, it is possible to improve the throughput of the macro cell base station MeNB.

[Other Embodiments]

As described above, the present invention has been described according to the embodiments. However, it must not be understood that the discussions and the drawings constituting a part of this disclosure limit the present invention/From this disclosure, various alternative embodiments, examples and operational techniques are apparent to those skilled in the art.

Figure 12:
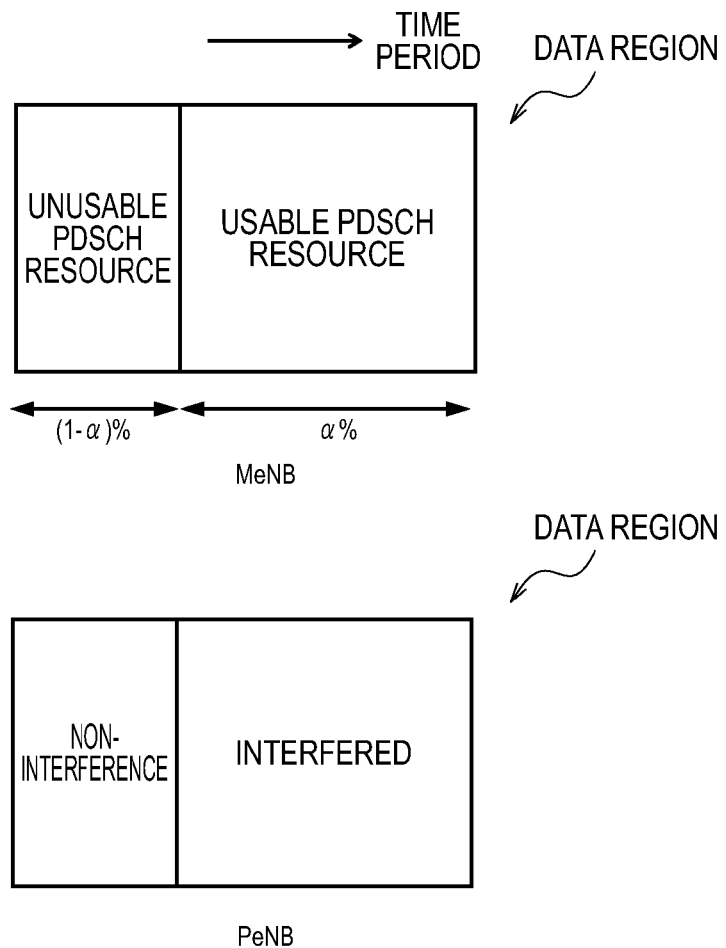
FIG. 12 is a diagram for explaining the case of time-dividing the PDSCH resources.

In each of the aforementioned each embodiments, the case of frequency-dividing the PDSCH resources has been described. However, the PDSCH resources may be time-divided. FIG. 12 is a diagram for explaining the case of time-dividing the PDSCH resources. As illustrated in FIG. 12, a data region of a downlink subframe is time-divided to provide the macro cell unusable PDSCH resources (or the macro cell low power PDSCH resources) and the macro cell usable PDSCH resources (or the macro cell normal power PDSCH resources). A ratio of the time division may be arbitrarily set. However, according to the LTE specifications, the resources are divided in the units of OFDM symbols.

Figure 13:
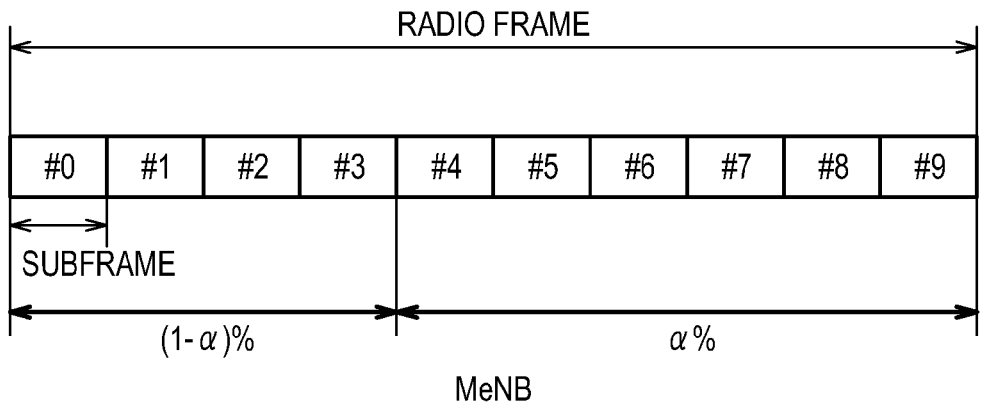
FIG. 13 is a diagram for explaining another case of time-dividing the PDSCH resources.

Alternatively, the subframe may not be time-divided in the units of OFDM symbols, and the radio frame illustrated in FIG. 2 may be time-divided in the units of subframes. FIG. 13 is a diagram for explaining the case of time-dividing a radio frame in the units of subframes. As illustrated in FIG. 13, one radio frame includes subframes corresponding to the macro cell unusable PDSCH resources (or the macro cell low power PDSCH resources) and subframes corresponding to the macro cell usable PDSCH resources (or the macro cell normal power PDSCH resources).

In each of the aforementioned embodiments, the resource division on PDSCH (that is, the data region division) has been described. However, the present invention may be applied not only to the PDSCH, but also to resource division on PDCCH (that is, control region division). For the resource division on PDCCH, frequency division or time division may be employed.

In each of the aforementioned embodiments, the case has been described in which the coverage of the pico cell base station PeNB is expanded. However, the present invention is not limited thereto. Even when the coverage of the pico cell base station PeNB is not expanded, the present invention is effective in the reduction of inter-base station interference in the heterogeneous network.

In each of the aforementioned embodiments, the load level indicates the number of radio terminals in a connected state. However, in addition to such a load level index, a use rate of a radio resource or the amount of packets transmitted and received, for example, may be employed as the load level.

In addition, in LTE Advanced, since a relay node, that is, a base station in which backhaul is configured by radio, is expected to be employed, and the X2 interface is expected to be employed in the relay node, the relay node may be used as the low power base station according to the present invention.

Moreover, in each of the aforementioned embodiments, the LTE system has been described. However, the present invention may also be applied to other radio communication systems such as radio communication systems based on WiMAX (IEEE 802.16).

As described above, it must be understood that the present invention includes various embodiments and the like that are not described herein.

Note that the entire content of the Japanese Patent Application No. 2010-277383 (filed on Dec. 13, 2010) is incorporated herein by reference.

INDUSTRIAL APPLICABILITY

As mentioned above, a radio communication system, a base station, and a control method of the base station of the present invention is useful for mobile communication, with which it is possible to reduce inter-base station interference in a heterogeneous network and to improve the throughput of the entire system.

The invention claimed is:

1. A radio communication system comprising a first base station and a second base station, wherein a radio frame of the radio communication system includes plural subframes, each subframe is formed by two consecutive time slots, each subframe includes plural resource blocks in frequency domain, and each resource block is formed by plural subcarriers, the first base station comprising:
a controller configured to:
determine a subframe arrangement formed by at least one first subframe, and at least one second subframe in which transmission power of the first base station is limited to low compared with the at least one first subframe; and
set the subframe arrangement to the first base station when a cell coverage of the second base station is extended; and
a receiver configured to receive information on resource block use rate in the second base station from the second base station, wherein
the controller modifies the subframe arrangement at least based on the information on the resource block use rate.

2. A first base station in a radio communication system, wherein a radio frame of the radio communication system includes plural subframes, each subframe is formed by two consecutive time slots, each subframe includes plural resource blocks in frequency domain, and each resource block is formed by plural subcarriers, the first base station comprising:
a controller configured to determine: a subframe arrangement formed by at least one first subframe, and at least one second subframe in which transmission power of the first base station is limited to low compared with the at least one first subframe; and
set the subframe arrangement to the first base station when a cell coverage of a second base station is extended; and
a receiver configured to receive information on resource block use rate in the second base station from the second base station, wherein
the controller modifies the subframe arrangement at least based on the information on the resource block use rate.

3. A second base station in a radio communication system, wherein a radio frame of the radio communication system includes plural subframes, each subframe is formed by two consecutive time slots, each subframe includes plural resource blocks in frequency domain, and each resource block is formed by plural subcarriers, the second base station comprising:
a transmitter configured to transmit information on resource block use rate in the second base station to a first base station, when a cell coverage of the second base station is extended and the first base station sets a subframe arrangement formed by at least one first subframe, and at least one second subframe in which transmission power of the first base station is limited to low compared with the at least one first subframe, wherein
the information on the resource block use rate is used for modifying the subframe arrangement.

4. A control method for a first base station in a radio communication system, wherein a radio frame of the radio communication system includes plural subframes, each subframe is formed by two consecutive time slots, each subframe includes plural resource blocks in frequency domain, and each resource block is formed by plural subcarriers, the control method comprising:
determining a subframe arrangement formed by at least one first subframe, and at least one second subframe in which transmission power of the first base station is limited to low compared with the at least one first subframe;

setting the subframe arrangement to the first base station when a cell coverage of a second base station is extended;
receiving information on resource block use rate in the second base station from the second base station; and
modifying the subframe arrangement at least based on the information on the resource block use rate.

5. A control method for a second base station in a radio communication system, wherein a radio frame of the radio communication system includes plural subframes, each subframe is formed by two consecutive time slots, each subframe includes plural resource blocks in frequency domain, and each resource block is formed by plural subcarriers, the control method comprising:
transmitting information on resource block use rate in the second base station to a first base station, when a cell coverage of the second base station is extended and the first base station sets a subframe arrangement formed by at least one first subframe, and at least one second subframe in which transmission power of the first base station is limited to low compared with the at least one first subframe, wherein
the information on the resource block use rate is used for modifying the subframe arrangement.

* * * * *